United States Patent [19]

Ferris

[11] Patent Number: 4,998,605
[45] Date of Patent: Mar. 12, 1991

[54] PLASTIC CAGE FOR A ONE-WAY CLUTCH

[76] Inventor: Ernest A. Ferris, 146 Greenleaf Dr., Oak Brook, Ill. 60521

[21] Appl. No.: 478,441

[22] Filed: Feb. 12, 1990

[51] Int. Cl.⁵ ............................................. F16D 41/07
[52] U.S. Cl. .................................. 192/41 A; 192/45.1
[58] Field of Search ........................... 192/41 A, 45.1; 188/82.8

[56]  References Cited

U.S. PATENT DOCUMENTS

| 2,824,636 | 2/1958 | Troendly et al. | 192/45.1 |
| 3,194,369 | 7/1965 | Witte | 192/45.1 |
| 3,324,980 | 6/1967 | Rojic et al. | 192/45.1 |
| 4,347,920 | 9/1982 | Bordes | 192/41 A |

FOREIGN PATENT DOCUMENTS

| 2239173 | 2/1974 | Fed. Rep. of Germany | 192/45.1 |
| 3434499 | 3/1986 | Fed. Rep. of Germany | 192/41 A |
| 3601720 | 7/1987 | Fed. Rep. of Germany | 192/45.1 |

Primary Examiner—Richard Lorence
Attorney, Agent, or Firm—James A. Geppert

[57]  ABSTRACT

A one-way clutch assembly positioned between inner and outer races for the clutch and which includes a one-piece generally cylindrical cage formed of a suitable plastic material having a plurality of openings to receive sprags therein, and a pair of integral spring fingers in each opening to engage the opposite sides of a sprag and lightly urge the sprag into contact with the interior and exterior surfaces of the inner and outer races of the clutch. To provide a full-phased sprag clutch, an additional cage ring is provided concentric to and closely fitting the cage with a plurality of openings generally aligned with the cage openings to provide a full-phased clutch operation. Further, a separate metal spring member can be substituted for the integral spring fingers, which spring member clamps onto a cross piece of the cage and provides spring fingers extending into the cage opening to contact the sprag.

20 Claims, 3 Drawing Sheets

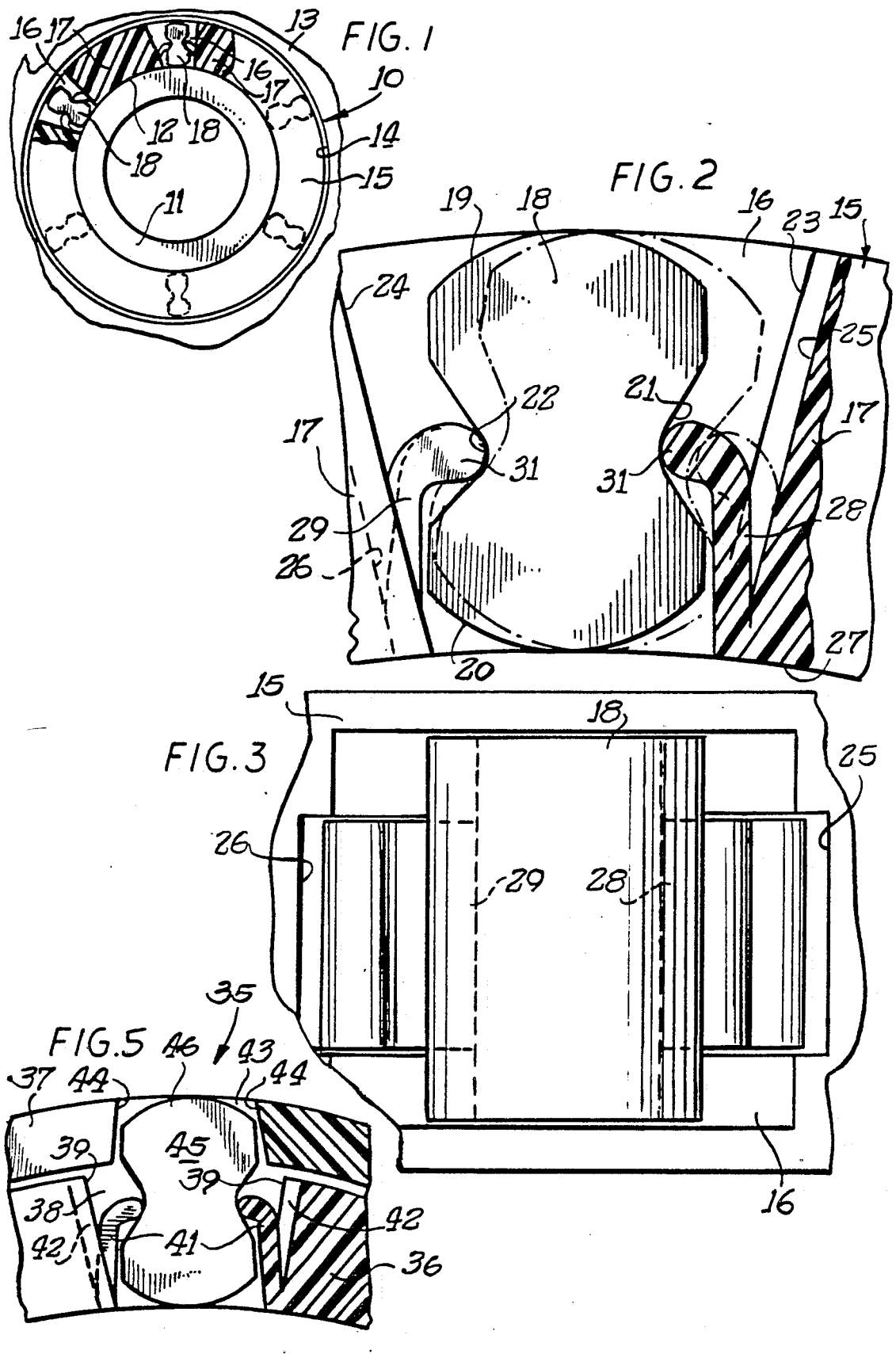

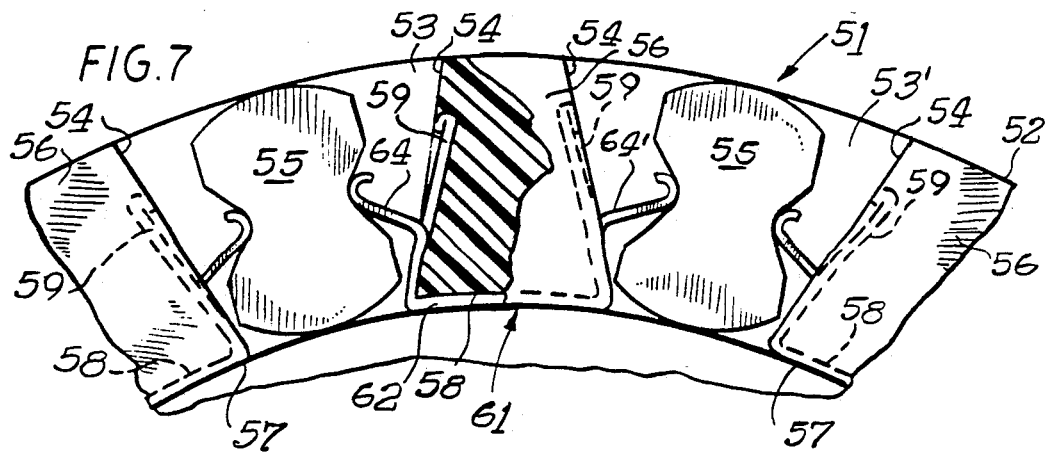
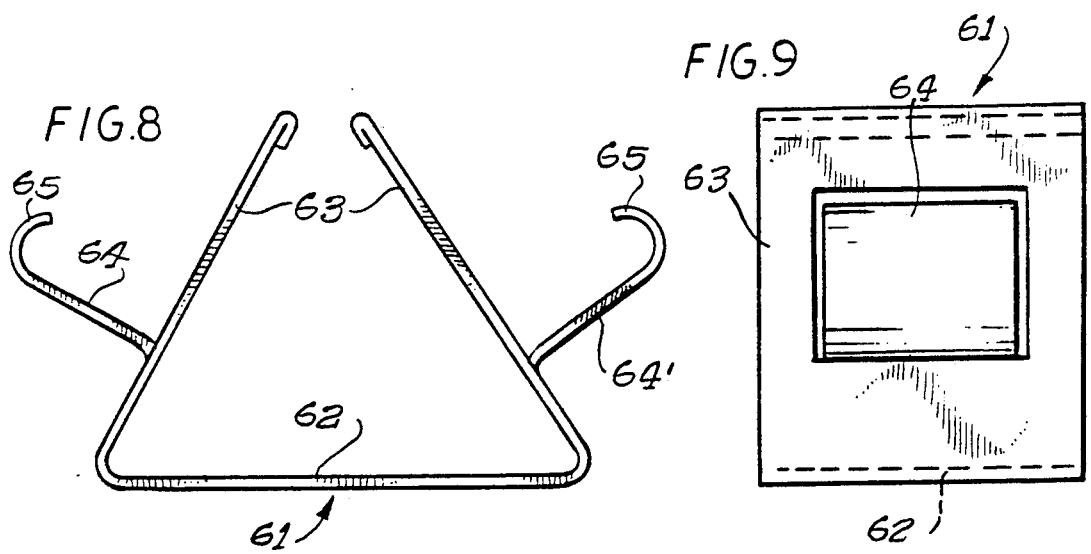
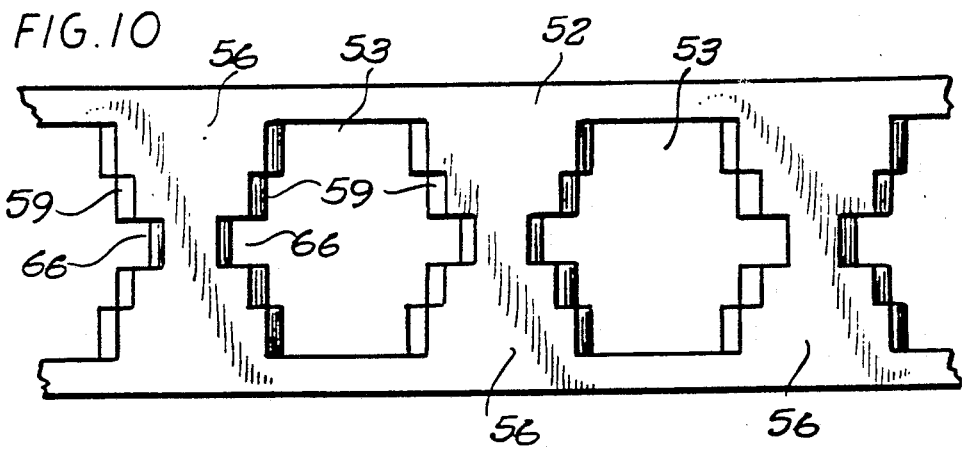

PLASTIC CAGE FOR A ONE-WAY CLUTCH

TECHNICAL FIELD

The invention disclosed herein relates to a one-way or overrunning clutch of the sprag type having a combination cage, bearing and sprag energizer formed of plastic in a single unit. Alternatively, the sprag energizer may be a spring member separate from the cage for the sprags depending on the conditions of manufacture and/or use.

BACKGROUND

Conventional one-way clutches, whether of the roller or sprag type, are positioned between inner and outer generally cylindrical races which are engaged by the rollers or sprags to lock the clutch in a single direction of rotation and allow overrunning in the opposite direction. Where a roller clutch is utilized, one of the two races is designed to provide ramps either in the interior surface of the outer race or on the exterior surface of the inner race. A one-way or overrunning clutch normally includes at least one cage and an energizing spring, both of which have a plurality of aligned openings through which the sprags or rollers extend into contact with the generally cylindrical surfaces of the races. Many clutches utilize both inner and outer cage members with the energizing spring located therebetween.

With the discovery of numerous plastic materials which are capable of withstanding the temperatures and stresses involved in one-way clutch applications, plastic materials now can replace the usual metallic cage and/or spring member in the clutch. More recently, in roller clutches, retainers have been formed of a resilient molded plastic material wherein the rims, bars and springs are formed as a single piece. Plastic materials have also been tried for the outer cage and energizing springs in roller and/or sprag clutches.

DISCLOSURE OF THE INVENTION

The present invention relates to a substantially all-plastic one-way clutch cage construction which is used in a sprag clutch having a one-piece cage that also can act as a bearing for the clutch races and has integral energizing spring means for actuation of the sprags. The one-piece cage is formed of a suitable plastic which can withstand the temperature extremes present in the clutch environment and is provided with generally radially extending energizing spring fingers for the actuation of the sprags. Although not a full-phased construction, the one-piece cage could be concentrically split into inner and outer cage members to provide for a full-phased sprag clutch construction. Also, the radial spring fingers for the cage could be stamped out of a flexible spring steel or like material and be separate from but assembled onto the one-piece cage for suitable applications.

BRIEF DESCRIPTION OF THE DRAWINGS

FIG. 1 is a side elevational view of a one-way clutch construction containing the one-piece plastic combination cage, spring and bearing unit of the present invention.

FIG. 2 is an enlarged cross sectional view of a portion of the cage showing a single sprag positioned therein.

FIG. 3 is a top plan view of the portion of the cage and sprag of FIG. 2.

FIG. 5 is a partial enlarged cross sectional view of a third form of cage for a full-phased sprag clutch.

FIG. 7 is a partial enlarged cross sectional view of a fourth embodiment of one-way clutch utilizing separate energizing springs in combination with the one-piece cage member.

FIG. 8 is an end elevational view of an energizing spring member of FIG. 7.

FIG. 9 is a side elevational view of the spring member of FIG. 7.

FIG. 10 is a top plan view of a portion of the cage shown in FIG. 7 with the spring and sprag omitted.

MODES FOR CARRYING OUT THE INVENTION

Figure 4:
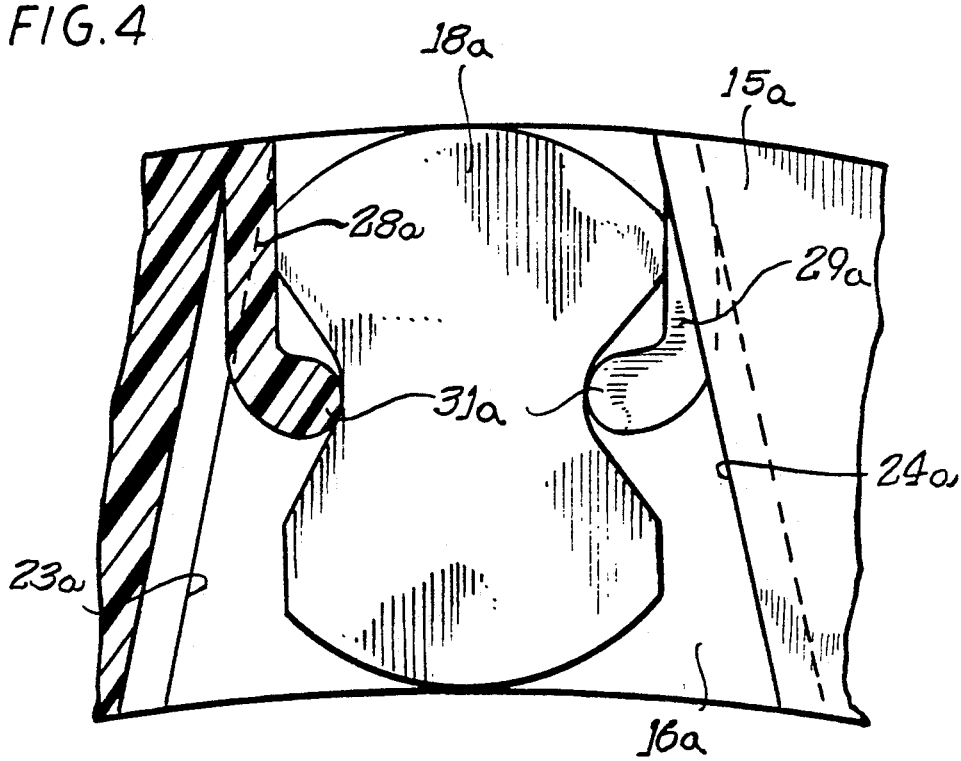
FIG. 4 is an enlarged partial cross sectional view of a second embodiment of clutch cage similar to FIG. 2.

Referring more particularly to the disclosure in the drawings wherein are shown illustrative embodiments of the present invention, FIG. 1 discloses a one-way or overrunning clutch 10 positioned between an inner race 11 having an exterior cylindrical surface 12 and an outer race 13 having an interior cylindrical surface 14. The clutch 10 comprises a one-piece cylindrical plastic cage 15 having a plurality of circumferentially spaced generally radial openings 16 separated by cross pieces or crossbars 17, with each opening receiving an appropriately shaped sprag 18 having an outer curved edge or wedging surface 19 adapted to contact the interior surface 14 of the outer race 13 and an inner curved edge or wedging surface 20 adapted to contact the exterior surface 12 of the inner race 11. As shown, each sprag is provided with a pair of transversely extending notches 21 and 22 positioned intermediate of the end surfaces 19 and 20 and slightly offset from each other.

Each opening 16 is provided with outwardly diverging side walls 23 and 24 having radially extending central recesses 25 and 26 for a purpose to be later described. Extending upwards in a generally radial direction from the inner surface 27 of the cage are a pair of radially extending spring fingers 28 and 29 integral with and formed of the same material as the cage. Each finger terminates in an enlarged rounded end 31 located to engage one of the transverse notches 21 or 22 formed in the sprag 18 to retain the sprag in the cage opening 16 and to lightly bias the sprag into contact with the surfaces of the inner and outer races. The recesses 25 and 26 act to receive its respective spring finger 28 or 29 and allow the sprag to rotate to its extreme positions against the cage without damaging the spring fingers. The spring fingers normally provide equal force against the sprag although, if the notches 21, 22 are not offset, then the fingers must provide unequal forces to properly actuate the sprag.

The sprags 18 are assembled into the cage from the internal diameter and the cage is positioned between the inner and outer races. The cage is so dimensioned that it will act as a bearing for the clutch in the races and retain the races in concentric position; the radial dimensions being calculated to allow for the difference in expansion of steel versus plastic. The cage is made of a plastic with good bearing properties and able to withstand transmission temperature extremes. This clutch is not "full-phased", however, the sprags are restricted from acting independently by the close fit of the sprag in the cage opening at the internal diameter of the cage. A radial slot through the cage may be necessary to allow for heat expansion. Also, the cage need not perform as a bearing in all applications.

As seen in FIG. 4, the cage 15a could be provided with openings 16a having outwardly converging side walls 23a, 24a with radially inwardly extending fingers 28a, 29a being integral with the cage at its outer diameter and terminating in rounded ends 31a, 31a. The openings would thus contact the sprags closely at the outer diameter rather than the inner diameter of the cage.

FIG. 5 discloses an alternate embodiment of the plastic cage where a "full-phased" clutch is required; i.e., a clutch where all of the sprags operate together. In the version of FIGS. 1 to 3, the enlarged openings 16 housing the sprags will not prevent one or more sprags from disengaging at any point in time during engagement of the sprags with the inner and outer races. Thus, one or more sprags may fail to carry their share of the load on the clutch during clutch engagement. To prevent this unphased operation, the one-way clutch 35 includes a one-piece cage 36 which is approximately two-thirds of the diameter of the cage shown in FIG. 1 along with a secondary concentric cage 37, which may also be formed of a suitable plastic material. The cage 36 again has a plurality of circumferentially spaced openings 38 with diverging walls 39 and integral spring fingers 41 in the openings; central recesses 42 in the diverging walls 39 acting to receive the spring fingers when the sprags are moved to their extreme positions against the cage.

The secondary cage ring 37 of a internal diameter slightly larger than the cage 36 has a plurality of spaced openings 43 generally aligned with the openings 38 in the cage 36 but with generally parallel or slightly outwardly converging walls 44 of substantially the same width as the width of the outer ends 46 of the sprags 45 extending outwardly therethrough to contact the interior wall of an outer race (not shown). The dimensions of the opening 43 relative to the width of the end of the sprag 45 helps prevent any of the sprags from moving independently, and thus out of phase, relative to the remaining sprags during normal operation of the clutch.

Figure 6:
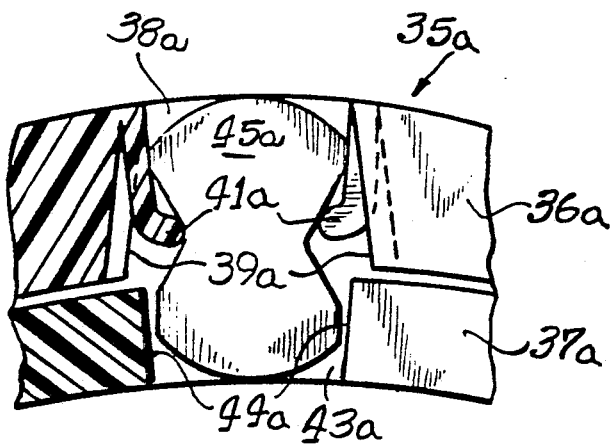
FIG. 6 is as view similar to FIG. 5, but showing an alternate version of full-phased sprag clutch.

FIG. 6 discloses a alternate form of full-phased clutch 35a wherein the secondary cage 37a is located at the inner diameter of the cage 36a carrying the sprags 45a. The cage 36a has inwardly extending generally radial spring fingers 41a, 41a engaging the notches in the sprags in openings 38a having outwardly converging walls 39a. The secondary cage has an opening 43a with walls 44a that closely conform with the exterior dimensions of the sprag.

FIGS. 7 through 10 of the drawings disclose a further embodiment of a one-way clutch 51 where separate springs 61 are utilized with a one-piece clutch cage 52. If costs, molding difficulties, or inability to control or obtain sufficient energizing force with the integral spring fingers of FIGS. 1 through 6 is encountered, separate springs may be necessary. Other conditions requiring separate springs would be inadequate fatigue life or inability of the integral spring fingers to withstand the high temperatures in use. The one-piece plastic cage 52 has a plurality of circumferentially spaced openings 53 having outwardly diverging walls 54 to receive a plurality of sprags 55 in an unphased arrangement. The inner circumference 57 of the cross pieces 56 separating the openings 53 in the cage has recessed portions 58 and the walls also have recessed portions 59 to receive and position a plurality of flexible metal springs 61 therein as shown in FIG. 7.

As seen in FIGS. 8 and 9, each spring has a generally U-shaped body with a central base 62 and a pair of converging arms 63; the base and the arms being received in the recessed portions 58 and 59 in the inner circumference and diverging walls of the cage, respectively. Stamped out of each arm 63 is a spring arm 64 terminating in a curled end 65; each spring arm extending inwardly into one of the openings 53 from its respective arm 63. Considering FIG. 7, one spring arm 64 of a spring 61 extends into a sprag opening 53 while the other spring arm 64' of the same spring extends into an adjacent opening 53' in the cage. Each recessed portion 59 in the opening wall has a central deeper recess 66 (FIG. 10) to receive the curled end 65 of the spring arm 64 if the sprag 55 is moved to its extreme position against the cage, thus compressing the spring against the wall. The spring arms 64 of the springs 61 operate in the same manner as the integral spring arms of FIGS. 1 through 6.

Figure 11:
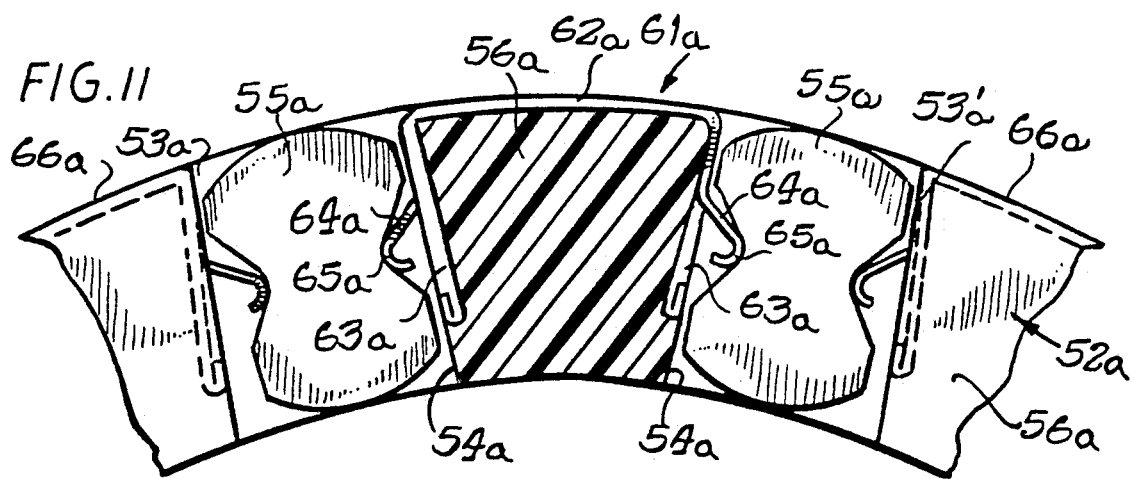
FIG. 11 is a partial cross sectional view similar to FIG. 7, but showing an alternate mounting of the separate energizing springs.

FIG. 11 discloses an alternate mounting of the springs 61a on the cage 52a for actuation of the sprags 55a. In this version, the cross arms 56a have outwardly converging sides 54a defining the openings 53a, 53a' and the springs each have a base 62a engaging the outer surface 66a of the cross arm and converging arms 63a received in grooves in the side walls 54a of the cage arms 56a. Each arm has a spring arm 64a stamped therein extending into the opening 53a and terminating in a curved end 65a. The spring 61a is arranged so that one arm 64a extends into opening 53a while the other arm extends into the adjacent opening 53a'.

I claim:

1. In a one-way clutch assembly comprising an inner race having an exterior cylindrical surface, an outer race having an interior cylindrical surface, and an overrunning clutch with a plurality of sprags acting to contact said interior and exterior surfaces to engage the clutch, the improvement comprising a one-piece plastic cage having an inner diameter and an outer diameter concentrically positioned between the inner and outer races and having a plurality of circumferentially spaced openings therethrough receiving the sprags, each opening having diverging walls, and a pair of spring fingers within each opening integral with the cage and extending generally radially to engage a sprag.

2. A one-way clutch assembly as set forth in claim 1, wherein the spring fingers are integral with said cage at the inner diameter thereof and extend generally radially outwardly.

3. A one-way clutch assembly as set forth in claim 1, wherein the spring fingers are integral with the cage at the outer diameter thereof and extend generally radially inwardly.

4. A one-way clutch assembly as set forth in claim 1, in which each sprag has opposite wedging end surfaces adapted to engage the interior and exterior surfaces of the inner and outer races and transverse notches in the opposite sides thereof, each said spring finger terminating in an enlarged rounded end extending into the opening to engage a transverse notch.

5. A one-way clutch assembly as set forth in claim 1, wherein each opening has opposite outwardly diverging sidewalls, and each sidewall includes a central generally radial recess to receive a spring finger.

6. A one-way clutch assembly as set forth in claim 1, wherein each opening has opposite inwardly diverging side walls, and each side wall has a central generally radial recess to receive a spring finger.

7. A one-way clutch assembly as set forth in claim 1, wherein said inner and outer diameters of said cage act as bearing surfaces for the inner and outer races.

8. A one-way clutch assembly as set forth in claim 1, wherein said spring fingers are integral with the cage at a diameter thereof, said openings each having diverging walls with a generally central recess in each wall, and each sprag includes opposite wedging surfaces adapted to engage the interior and exterior surfaces of the inner and outer races and transverse offset notches in the opposite sides thereof, each said spring finger terminating in an enlarged rounded end extending inwardly into the cage opening to contact a transverse notch.

9. A one-way clutch assembly as set forth in claim 1, wherein the thickness of said cage is approximately two-thirds the radial height of a sprag, and a separate cage ring is located concentric to and closely fitting said cage, said cage ring having a plurality of circumferentially spaced openings generally aligned with the openings in said cage to receive the ends of said sprags.

10. A one-way clutch assembly as set forth in claim 9, wherein said openings in said cage ring are of a width closely approximating the width of a sprag.

11. A one-way clutch assembly as set forth in claim 10, wherein the cage ring acts to provide a full-phased sprag arrangement.

12. A one-way clutch assembly as set forth in claim 11, wherein said spring fingers are integral with said cage and act independently of said cage ring.

13. A one-way clutch assembly as set forth in claim 9, in which said cage ring is positioned at the exterior circumference of said cage.

14. A one-way clutch assembly as set forth in claim 9, wherein said cage ring is positioned at the interior circumference of said cage.

15. In a one-way clutch assembly comprising an inner race having an exterior cylindrical surface, an outer race having an interior cylindrical surface, and an overrunning clutch with a plurality of sprags acting to contact said interior and exterior surfaces to engage the clutch, the improvement comprising a one-piece plastic cage concentrically positioned between the inner and outer races and having a plurality of circumferentially spaced openings therethrough receiving said sprags, each opening having diverging walls, and a spring member which is separately formed of metal and includes a U-shaped base with converging arms, and outwardly extending spring fingers at an angle to said converging arms and extending generally radially in each opening to engage a sprag.

16. A one-way clutch assembly as set forth in claim 15, wherein said spring member encompasses a cross piece of said cage separating said openings in said cage.

17. A one-way clutch assembly as set forth in claim 16, wherein said cage has a circumferential recess across the surface of each cross piece and extending into the sidewall forming the opening to receive the base and arms of said spring member.

18. A one-way clutch assembly as set forth in claim 16, wherein said sidewalls each have a central recess to receive the spring arm normally extending into contact with said sprag.

19. A one-way clutch assembly as set forth in claim 18, wherein said spring member has a pair of opposite arms which are received in adjacent openings in said cage.

20. A one-way clutch assembly as set forth in claim 15, wherein said cage includes cross arms separating the openings receiving said sprags, and said spring members have a base portion received at either the inner or outer surface of a cross arm with the converging arms extending along the diverging walls of adjacent openings and the spring arms extend inwardly into the adjacent openings to contact the sprags.

* * * * *